(12) United States Patent
Amtmann

(10) Patent No.: US 7,049,934 B2
(45) Date of Patent: *May 23, 2006

(54) DATA CARRIER FOR TRANSMITTING DATA WITH DIFFERENT REPETITION FREQUENCIES

(75) Inventor: Franz Amtmann, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 299 days.

This patent is subject to a terminal disclaimer.

(21) Appl. No.: 10/294,272

(22) Filed: Nov. 12, 2002

(65) Prior Publication Data

US 2003/0095033 A1     May 22, 2003

(30) Foreign Application Priority Data

Nov. 16, 2001     (EP)     ................... 01000638

(51) Int. Cl.
*H04Q 5/22*     (2006.01)
(52) U.S. Cl. ............... 340/10.2; 340/10.1; 370/445
(58) Field of Classification Search ...... 340/10.1–10.5, 340/5.6, 5.62, 5.64, 572; 342/44
See application file for complete search history.

(56) References Cited

U.S. PATENT DOCUMENTS 5,479,595 A * 12/1995 Israelsson ................... 398/115
5,485,154 A *  1/1996 Brooks et al. ................ 342/44
6,566,997 B1 *  5/2003 Bradin ....................... 340/10.2

FOREIGN PATENT DOCUMENTS

WO     WO9965168     *  5/1999

* cited by examiner

*Primary Examiner*—Michael Horabik
*Assistant Examiner*—M Shimizu
(74) *Attorney, Agent, or Firm*—Adam Stroud

(57) ABSTRACT

A data carrier is configured to monitor the power of a received signal from a base station, and to vary its "Aloha" transmission based on the power of the received signal. The time period, or repetition frequency, associated with the Aloha transmission is controlled based on the received power, such that a higher received power provides a longer time period between transmissions. In this way, transmitters that are farther away from the base station are provided more frequent opportunities to have their transmissions received without collisions than transmitters that are closer to the base station.

10 Claims, 2 Drawing Sheets

DATA CARRIER FOR TRANSMITTING DATA WITH DIFFERENT REPETITION FREQUENCIES

The invention relates to a data carrier which is intended and designed for contactless communication wit a communication station and for this purpose has reception means for receiving an interrogation signal which can be generated by a communication station and can be transmitted to the data carrier in a contactless manner by a field produced by the communication station and acting on the data carrier, the data carrier having generating means for generating a response signal upon reception of the interrogation signal and processing means for processing the response signal, the processing means being designed to process the response signal into a transmission signal suitable for transmission to the communication station, and the transmission signal being recurrently transmitted to the communication station with a specific repetition frequency.

The invention further relates to a circuit for a data carrier for contactless communication with the communication station, the circuit comprising connection means for receiving an interrogation signal, generating means for generating a response signal upon reception of the interrogation signal, and processing means for processing the response signal.

The invention further relates to a communication station for contactless communication with a data carrier with the design described in the first paragraph above.

A data carrier with the design described in the first paragraph above and a circuit with the design described in the second paragraph above have been marketed in many design variants and are therefore known. The known data carrier and the known circuit are so designed that each data carrier which has come into a communication range of a communication station recurrently reports to a communication station by means of a response signal with a repetition frequency preferably defined as a function of a random number, the repetition frequency varying with different data carriers. The repetition frequency is determined by the hardware configuration, i.e. by the circuit layout. The repetition frequency may alternatively be laid down in a programmable manner by means of an EEPROM. In this case the response signals are not transmitted to a communication station at constant intervals, but at intervals differing in accordance with a varying random number. The random selection of the intervals between the response signals from each data carrier affords all data carriers situated in a communication range of a communication station at the same time the facility for successfully transmitting their response signals to the communication station so that they can be successfully detected by the communication station. The method outlined above is known to experts as the "non slotted Aloha" method.

In this known method, the data carriers report repeatedly to the communication station at the intervals determined by a random number, regardless of how often they have already transmitted a response signal to a communication station and have already been detected by the communication station, and regardless of how close the data carriers are to a communication station or how far away the data carriers are from a communication station, with the disadvantageous result that so-called strong data carriers, which are situated relatively close to the communication station and are accordingly supplied with a relatively large amount of power and consequently transmit relatively strong response signals to the communication station, are detected by the communication station more easily, efficiently and frequently than so-called weak data carriers, which are situated relatively far away from the communication station and are accordingly supplied with a relatively small amount of power so that they transmit relatively weak response signals to the communication station. This may entail the disadvantage that so-called weak data carriers, which are situated relatively far away from the communication station, are detected by a communication station only very slowly or at worst not at all.

It is an object of the invention to eliminate the difficulties cited above and to provide an improved data carrier, an improved circuit, and an improved communication station.

The aforementioned object is achieved in a data carrier according to the invention by the provision of features according to the invention, so that a data carrier according to the invention may be characterized in the following way:

Data carrier for contactless communication with a communication station, the data carrier comprising the following means: reception means for receiving an interrogation signal which can be generated by a communication station and can be transmitted to the data carrier in a contactless manner by a field produced by the communication station and acting on the data carrier, and generating means for generating a response signal upon reception of the interrogation signal and processing means for processing the response signal, the processing means being designed to process the response signal into a transmission signal suitable for transmission to the communication station, said transmission signal being recurrently transmitted to the communication station with a specific repetition frequency, and determination means for determinating at least one representative value which represents the field strength of the field acting on the data carrier, and control connection means between the determination means and the generating means and/or the processing means, said control connection means being designed to controllably influence the generating means and/or the processing means as a function of the at least one representative value, i.e. to vary, as a function of the at least one representative value, the repetition frequency with which the transmission signal is transmitted to the communication station.

The aforementioned object is achieved in a circuit according to the invention by the provision of features according to the invention, so that a circuit according to the invention may be characterized in the following way:

Circuit for a data carrier for contactless communication with a communication station comprising the following means: connection means for receiving an interrogation signal which can be generated by a communication station and can be transmitted to the data carrier and hence to the circuit for the data carrier in a contactless manner by a field produced by the communication station and acting on the data carrier, generating means for generating a response signal upon reception of the interrogation signal and processing means for processing the response signal, said processing means being designed to process the response signal into a transmission signal suitable for transmission to the communication station and the transmission signal being recurrently transmitted to the communication station with a specific repetition frequency, determination means for determinating at least one representative value which represents the field strength of the field acting on the data carrier, and control connection means between the determination means and the generating means and/or the processing means, said control connection means being designed to controllably influence the generating means and/or the processing means as a function of the at least one representative value, i.e. to vary, as a function of the at least one representative value, the repetition frequency with which the transmission signal is transmitted to the communication station.

Providing the features according to the invention ensures that, by simple means and at only a small additional cost, the repetition frequency of the generation of recurrently generated response signals is influenced as a function of at least one representative value and consequently as a function of the field strength acting on a data carrier. This advantageously allows so-called strong data carriers, which are situated relatively close to a communication station and are accordingly supplied with a relatively large amount of power and consequently transmit relatively strong response signals to a communication station, to transmit their response signals, recurrently transmitted to the communication station, at greater average intervals than so-called weak data carriers, which are situated relatively far away from a communication station and are accordingly supplied with a relatively small amount of power, so that they transmit relatively weak response signals to the communication station, because according to the invention such weak data carriers recurrently transmit their response signals to the communication station at relatively short average intervals, which significantly increases the probability of these response signals and hence of these weak data carriers being detected.

Control means capable of generating control data will permit a highly diversified control of the generating means and/or the processing means as a function of at least one representative value. It should be mentioned at this point, however, that in the simplest case it will also be possible to manage without the provision of control means, control connection means formed by simple electrical or electronic connections then being provided between the determination means on the one hand and the generating means and/or the processing means on the other, which control connection means can feed control commands emitted by the determination means directly to the generating means and/or the processing means.

It should be further mentioned at this point that it is possible, in the case of a data carrier according to the invention and of a circuit according to the invention, to influence both the generating means and the processing means as a function of at least one representative value in order to vary, as a function of at least one representative value, the repetition frequency with which a transmission signal is transmitted to a communication station. It is also possible to influence only the processing means as a function of at least one representative value. It has proved particularly advantageous, however, if the control connection means are provided between the determination means and the generating means for generating the response signals, and if the generating means generate the response signals recurrently with a specific repetition frequency, and if the generating means can be influenced via the control connection means as a function of at least one representative value, in order to vary the repetition frequency of the generation of the response signal and consequently of the transmission signal to the communication station generated from the response signal.

The aforementioned object is achieved in a communication station according to the invention by the provision of features according to the invention, so that a communication station according to the invention may be characterized in the following way:

Communication station for contactless communication with a data carrier which is designed for contactless communication with the communication station and comprising the following means: reception means for receiving an interrogation signal which can be generated by the communication station and can be transmitted to the data carrier in a contactless manner by a field produced by the communication station and acting on the data carrier, and generating means for generating a response signal upon reception of the interrogation signal and processing means for processing the response signal, which processing means are designed to process the response signal into a transmission signal suitable for transmission to the communication station, said transmission signal being recurrently transmitted to the communication station with a specific repetition frequency, determination means for determinating at least one representative value which represents the field strength of the field acting on the data carrier, and control connection means between the determination means and the generating means and/or the processing means, said control connection means being designed to controllably influence the generating means and/or the processing means as a function of the at least one representative value, i.e. to vary, as a function of the at least one representative value, the repetition frequency with which the transmission signal is transmitted to the communication station, the communication station comprising the following means: command signal generating means for generating command signals, reception means for receiving the transmission signal transmitted from the data carrier to the communication station, processing means for processing the transmission signal received, repetition frequency detection means for detecting the repetition frequency with which the transmission signal is transmitted to the communication station, and decision means which interact with the repetition frequency detection means and which are intended and designed to decide on the generation of at least one command signal as a function of the repetition frequency, detected by the repetition frequency detection means, with which the transmission signal is transmitted to the communication station.

Provision of the features according to the invention in a communication station according to the invention is a simple way of ensuring, at only a small additional cost, that the generation of specific command signals is permitted or enabled by the decision means only if that data carrier which is responsible for originating the command signals to be generated is exposed to a field strength in excess of a specific minimum field strength, which has been determined by the determination means in the data carrier and expressed by the representative value generated in the data carrier, said representative value having ultimately influenced the repetition frequency with which the transmission signal is transmitted from the data carrier to the communication station. This readily and advantageously ensures, for example, that in a control system having a communication station according to the invention, a control signal for an object controllable by the control system is generated by a host computer of the control system only if the control data carrier for the control system is in close proximity to the communication station.

In an alternative embodiment, a write command signal for a data carrier is generated by the command signal generating means of the communication station according to the invention only if the relevant data carrier is sufficiently close to the communication station and is accordingly exposed to a relatively high field strength, and is a consequently supplied with a relatively high power, as is required for performing a writing process. This is also a simple way of ensuring that so-called security functions in a data carrier, which are relatively computer-bound and consequently require a lot of power, are activated by a corresponding command signal in a data carrier only if the relevant data carrier is close enough to the communication station according to the invention and is supplied with sufficient power thereby.

The aforementioned aspects and other aspects of the invention will be apparent from the embodiments described below and are explained with reference to these embodiments The invention will be further described with reference to embodiments shown in the drawings to which, however, the invention is not restricted.

Figure 1:
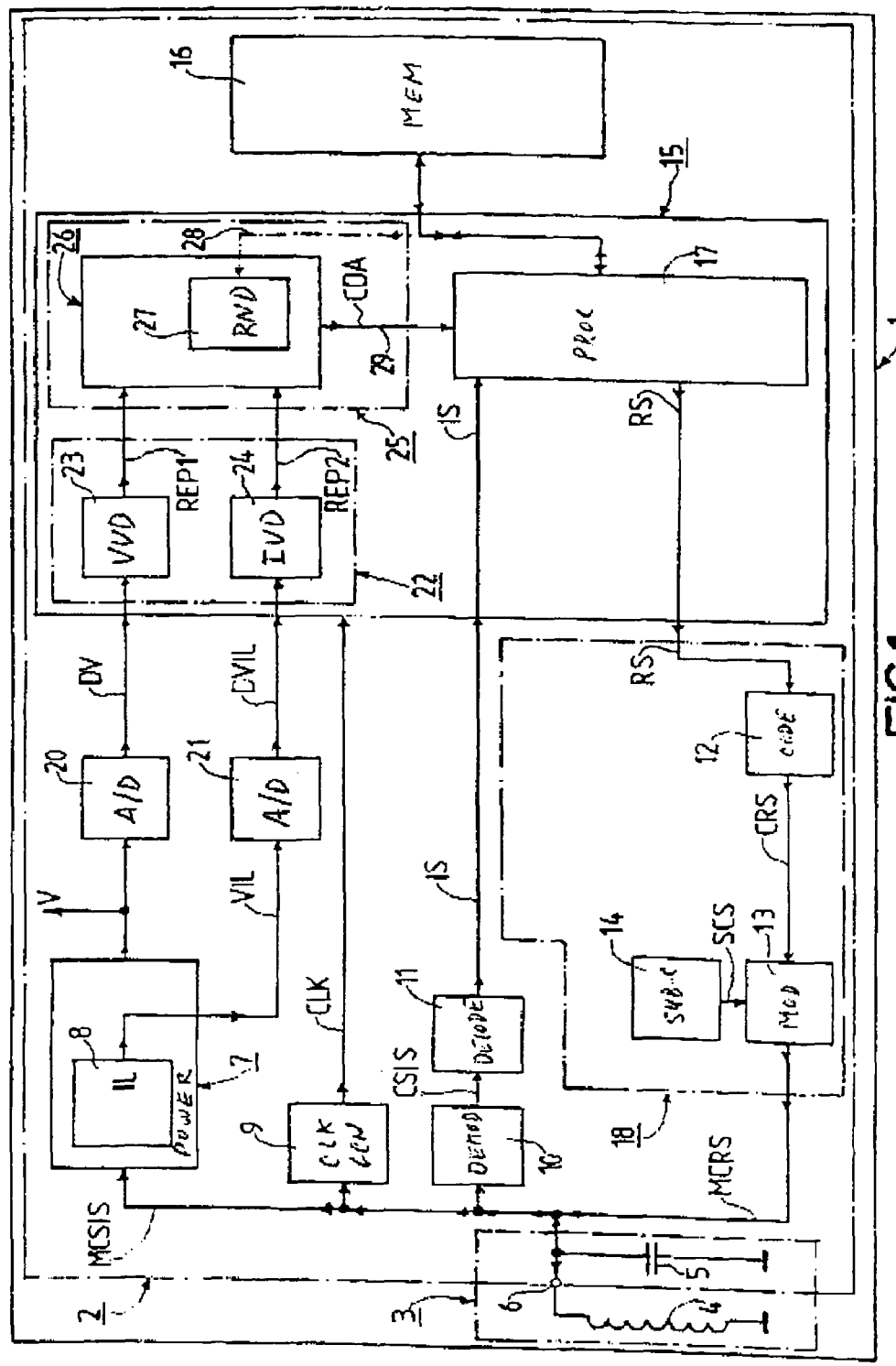
FIG. 1 is a schematic representation in the form of a block circuit diagram of what is, in this context, an essential part of a data carrier and a circuit for the said data carrier in a first embodiment of the invention.

FIG. 1 shows a data carrier 1 having a circuit 2 for the data carrier 1 in a first embodiment the invention. The circuit 2 is an integrated circuit. The data carrier 1 is intended and designed for contactless communication with a communication station 40 shown in FIG. 2. The data carrier 1 is in this case a data carrier 1 which is connected to a product and in which data relating to the product are stored, for example data relating to the product type, the sales price, the date of manufacture, an expiry date, and similar characteristics. The data carrier 1 may alternatively be intended and designed for other applications, however. Said communication station 40 renders it possible, where required, to retrieve the data stored in the data carrier 1 through contactless communication between the data carrier 1 and the communication station 40. For a flawless performance of such contactless communication, the communication station 40 must be capable of flawlessly detecting the data carrier 1, in order to be able to process the data carrier 1 further, for example to write to or read out from the data carrier, and in many applications must also be capable of selecting from a number of such data carriers. For flawless detection of a data carrier 1 using a communication station 40, the data carrier 1 has a series of means which will be examined in more detail below. It should be mentioned that FIG. 1 shows only those means which are of significance in the present context. The data carrier 1 comprises a number of other means which are not examined further here.

The data carrier 1 has transmission means 3 which form both reception means and transmitter means. The transmission means 3 comprise a transmission coil 4, which is provided outside the circuit 2, and a capacitor 5, which is incorporated in the circuit 2. The transmission coil 4 is connected to a contact terminal 6 of the circuit 2, the contact terminal 6 forming an integral part of connection means of the circuit 2. The transmission coil 4 and the capacitor 5 form a resonant circuit, the resonance frequency of which corresponds to a working frequency of at least one signal to be transmitted to the data carrier 1 from the communication station. In this instance, a signal to be transmitted to the data carrier 1 is an amplitude-modulated carrier signal MCSIS. It may, however, be some other form of transmission signal.

The transmission means 3, which form reception means, are intended and designed to receive an interrogation signal IS, this interrogation signal IS being contained in the amplitude-modulated carrier signal MCSIS. The interrogation signal IS can be generated by the communication station 40 and can be transmitted to the data carrier 1 in a contactless manner by a field produced by the communication station 40 and acting on the data carrier 1. In this instance transmission is by inductive means, i.e. by a transformer. However, transmission may alternatively be by electromagnetic means. The interrogation signal IS requests the data carrier 1 or a number of data carriers 1 present in a communication range of the communication station 40 to report to the communication station 40, i.e. to transmit a response signal to the communication station 40.

The data carrier 1 and the circuit 2 have a power supply circuit 7, which comprises a limiting stage 8, and a clock pulse regeneration stage 9 and a demodulation stage 10. The power supply circuit 7 and the clock pulse regeneration stage 9 and the demodulation stage 10 are each connected to the terminal contact 6, with the result that the modulated carrier signal MCSIS is fed to each of these circuit components.

The power supply circuit 7 is intended and designed to generate a supply DC voltage V using the amplitude-modulated carrier signal MCSIS fed to it, as has long been known in the art. The power supply circuit 7 comprises a limiting stage 8, by means of which the supply DC voltage V generated can be limited to a specific value. The provision of such a limiting stage 8 in such a data carrier 1 or in the power supply circuit 7 of such a data carrier 1 has also long been known. As a result of its limiting function, a limiting current IL occurs in the limiting stage 8, as is indicated symbolically in FIG. 1.

The clock signal regeneration stage 9 is intended and designed for the regeneration of a clock signal CLK using the amplitude-modulated carrier signal MCSIS. This measure, too, has long been known.

The demodulation stage 10 is intended and designed for demodulation of the amplitude-modulated carrier signal MCSIS. The amplitude-modulated carrier signal MCSIS can be fed to the demodulation stage 10, with the result that the demodulation stage 10 can generate and deliver a demodulated carrier signal CSIS. A decoding stage 11, to which the demodulated carrier signal CSIS can be fed and by means of which this still encoded signal can be decoded, is connected to the output side of the demodulation stage 10. This signal has previously been coded in the communication station 40. After decoding, the decoding stage 11 emits the inquiry signal IS.

The means hitherto described come into operation when the data carrier 1 is in a reception mode. With the data carrier 1, however, a transmit mode or a transmission mode from the data carrier 1 to the communication station 40 is also possible. For this purpose the data carrier 1 or the circuit 2 comprises a coding stage 12 and a modulation stage 13 connected to the output side of the coding stage 12, and a subcarrier signal generator 14 connected to the modulation stage 13. The modulation stage 13 is connected on the output side to the contact terminal 6 and hence to the transmission means 3, which also form transmitter means. A response signal RS, the generation of which will be examined in more detail below, can be fed to the coding stage 12. By means of the coding stage 12 it is possible to code the response signal RS, the coding stage 12 emitting a coded response signal CRS after coding. The coded response signal CRS can be fed to the modulation stage 13. A subcarrier signal SCS generated by the subcarrier signal generator 14 can also be fed to the modulation stage 13. The modulation stage 13 performs an amplitude modulation of the coded response signal CRS using the subcarrier signal SCS, so that the modulation stage 13 delivers an amplitude-modulated and coded response signal MCRS to the transmission means 3, the transmission means 3 providing for transmission to the communication station 1. Instead of an amplitude modulation, however, a phase modulation or a frequency modulation may also be performed.

The data carrier 1 and the circuit 2 of the data carrier 1 contain a microcomputer 15. A hard-wired logic circuit may also be provided instead of the microcomputer 15, however. Storage means 16 comprising a RAM, a ROM, and an EEPROM, interact with the microcomputer 15, as has long been known. The microcomputer 15 provides data processing means 17. The data processing means 17 serve for processing a received interrogation signal IS and further serve for generating a response signal RS in response to a received interrogation signal IS. In addition to other means (not shown), therefore, the data processing means 17 also form generating means 17 for generating a response signal RS upon reception of an interrogation signal IS or in response to a received interrogation signal IS. The response signal RS is generated using data which are contained in the storage means 16 and are characteristic of the data carrier 1. The generating means 17 are in this example designed so that they recurrently generate the response signal RS with a specific repetition frequency, the repetition frequency varying as a function of random numbers and other influencing factors, which will be examined in more detail below.

The data carrier 1 and the circuit 2 furthermore contain processing means 18 for processing the response signal RS. The processing means 18 process the response signal RS into a transmission signal suitable for transmission to the communication station 1, i.e. into the modulated and coded response signal MCRS. The processing means 18 comprises the coding stage 12, the modulation stage 13, and the subcarrier signal generator 14.

A first analog/digital converter 20 and a second analog/digital converter 21 are provided in the data carrier 1 and the integrated circuit 2. The first analog/digital converter 20 is connected on the input side to the output of the power supply circuit 7, so that a first digital value DV representative of the supply DC voltage occurring at this output can be generated by the first analog/digital converter 20. A voltage VIL proportional to the limiting current IL occurring in the limiting stage 8 can be fed to the second analog/digital converter 21, so that a second digital value DVIL representative of this voltage VIL and consequently of the limiting current IL can be generated by the second analog/digital converter 21.

By means of the microcomputer 15 determination means 22 being realized to which determination means 22 the first digital value DV and the second digital value DVIL can be fed. The determination means 22 are intended and designed to calculate two representative values REP1 and REP2, which representative values REP1 and REP2 each represent the field strength of the field acting on the data carrier 1. The determination means 22 contain a voltage value determination stage 23 and current value determination stage 24. Using the first digital value DV, the voltage value determination stage 23 generates the first representative value REP1, which bears a relation to the supply DC voltage V. Using the second digital value DVIL, the current value determination stage 24 generates the second representative value REP2, which bears a relation to the limiting current IL in the limiting stage 8. By virtue of the relationships existing, the two representative values REP1 and REP2 represent the field strength of the field acting on the data carrier 1, so that the data carrier 1 through the two representative values REP1 and REP2 comprises information which indicates the level of the field strength acting on the data carrier 1 and hence the distance of the data carrier 1 from the communication station 1.

In the data carrier 1 or in the integrated circuit 2, control connection means 25 are advantageously provided between the determination means 22 and the generating means 17. It is possible to exert a controlling influence on the generating means 17 via the control connection means 25 as a function of the two representative values REP1 and REP2. The controlling influence exerted on the generating means 17 is here intended to vary the repetition frequency with which the transmission signal is transmitted as a function of the two representative values REP1 and REP2.

In the control connection means 25 in the data carrier 1 or the circuit 2, control means 26 are provided, which interact with the determination means 22, to which the two representative values REP1 and REP2 can be fed, which are designed to generate control data as a function of the two representative values REP1 and REP2, and which interact with the generating means 18 in order to vary the said repetition frequency by means of the control data CDA generated.

The control means 26 comprise a data generator 27, which in this case takes the form of a random number generator. The random number generator is intended to generate random numbers by means of which it is possible to influence the repetition frequency. The data generator 27 may alternatively be of a design, however, in which the so-called serial number of the data carrier 1 is fed from the storage means 16 to the data generator 27 via a diagrammatically indicated connection 28 and in which the data generator, from the serial number fed to it, generates data by means of which the repetition frequency can be influenced. Using the two representative values REP1 and REP2 and using the random number generated by the random number generator 27, the control means 26 can generate control data CDA which can be fed from the control means 26 via a connection 29 to the generating means 17. The control data CDA can influence the repetition frequency with which the response signal RS, generated by the generating means 17, i.e. by the data processing means 17, is relayed to the coding stage 12, and the modulated and coded response signal MCRS is subsequently transmitted from the data carrier 1 to the communication station 1.

The data carrier 1 and the circuit 2 are designed so that, at the occurrence of two representative values REP1 and REP2 each representing a high field strength of the field acting on the data carrier 1, the repetition frequency with which the data carrier 1 generates a response signal RS, which is then transmitted to the communication station 40, is so defined that such transmission occurs with a relatively low repetition frequency. If, on the other hand, the two representative values REP1 and REP2 represent a weak field strength of the field acting on the data carrier 1, the result will be that transmission occurs with a relatively high repetition frequency. This ensures, by simple means, that data carriers 1 which are exposed to different field strength values always transmit their response signal to the communication station 40 with different repetition frequencies, so that the probability of detecting a weak response signal from a so-called weak data carrier is greater than the probability of detecting a strong response signal from a so-called strong data carrier, and consequently a flawless detection of all data carriers present in the communication range of the communication station 40 is assured at all times.

Figure 2:
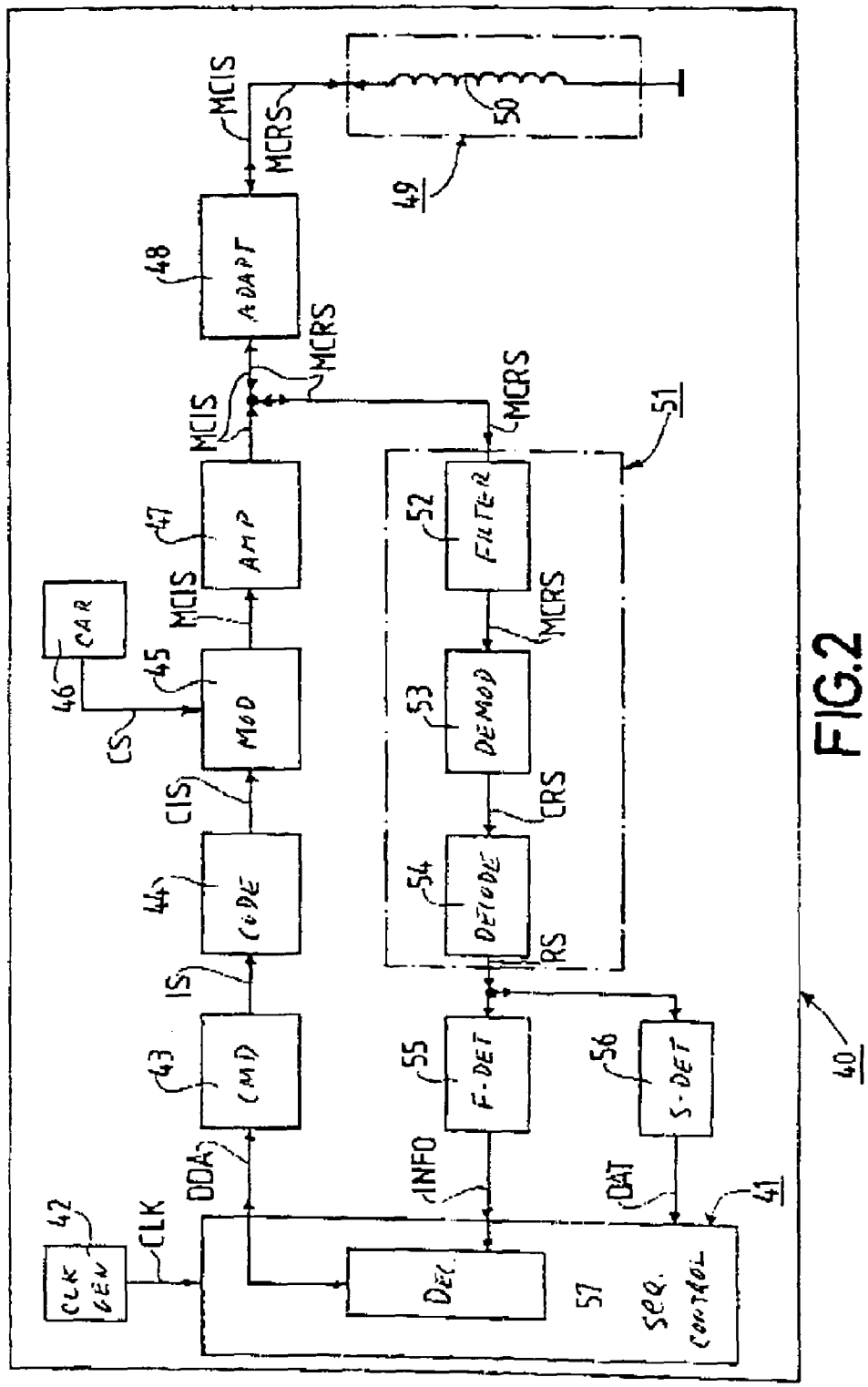
FIG. 2 is a schematic representation in the form of a block circuit diagram of what is, in this context, an essential part of a communication station in an embodiment of the invention.

FIG. 2 shows a communication station 40. The communication station 40 is intended and designed for contactless communication with a data carrier 1 according to FIG. 1, i.e.

the communication station 40 is designed for contactless communication with data carriers in which a transmission signal MCRS is transmitted to the communication station 40 with a specific repetition frequency.

The communication station 40 comprises sequence control means 41 which in this instance are provided by a microcomputer. The sequence control means 41 may take the form, however, of a hard-wired logic circuit. A clock signal generator 42 which delivers a clock signal CLK to the sequence control means 41 is connected to the sequence control means 41.

Command signal generating means 43 are connected to the sequence control means 41. The command signal generating means 43 are capable of generating a plurality of command signals, for example an interrogation signal, a select signal, a read command signal, a write command signal, and a number of other command signals. In FIG. 2 the interrogation signal IS is made to represent all command signals.

Coding means 44, which serve to subject a delivered command signal to coding, are connected to the output side of the command signal generating means 43. After coding, the coding means 44 produce a coded command signal, for example a coded interrogation signal CIS. Connected to the coding means 44 on the output side are modulation means 45, to which a coded command signal, for example a coded interrogation signal CIS, can be fed and to which, in addition, a carrier signal CS generated by a carrier signal generator 46 can also be fed. The modulation means 45 are capable of modulating the carrier signal CS supplied as a function of the coded command signal likewise supplied, so that after modulation the modulation means 45 can deliver a modulated coded command signal, for example a modulated coded interrogation signal MCIS. Connected to the output side of the modulation means 45 are amplifying means 47 capable of amplifying a modulated coded command signal. Connected to the output side of the amplifying means 47 are adapter means 48, to the output side of which transmission means 49 are connected, which contain a transmission coil 50 and which operate both as transmitter means and as reception means. A modulated coded command signal amplified by the amplifying means 47 is fed via the adapter means 48 to the transmission means 49 for transmission to all data carriers 1 according to FIG. 1 present in a communication range of the communication station 40.

The circuit elements hitherto described serve to transmit signals from the communication station 40 to the data carrier 1 of FIG. 1. Also provided in the communication station 40 are means which operate when a transmission signal is transmitted from a data carrier 1 FIG. 1 to the communication station 40. These means also include the transmission means 49 and the adapter means 48.

These means furthermore include processing means 51 capable of processing a transmission signal, for example a modulated coded response signal MCRS, transmitted from a data carrier 1 according to FIG. 1 to the communication station 40. The processing means 51 comprise filter means 52 connected to the adapter means 48, and connected to the output side of the filter means 52 are demodulation means 53, with decoding means 54 connected to the output side of the demodulation means 53. After the respective transmission signal has been filtered by the filter means 52, it is demodulated by the demodulation means 53 and then decoded by the decoding means 54, so that in the case of a modulated coded response signal MCRS transmitted to the communication station 40, a coded response signal CRS emerges from the demodulation means 53, and the response signal RS emerges from the decoding means 54.

Connected to the output side of the processing means 51 are repetition frequency detection means 55 and transmission signal detection means 56. The repetition frequency detection means 55 are designed to detect the repetition frequency with which a response signal RS has been transmitted to the communication station 40.

The transmission signal detection means 56 are intended and designed to detect the content of a transmission signal. For example, the transmission signal detection means 56 may detect the content of a response signal RS. This content may be the serial number of a data carrier 1, for example, and also data stored in the data carrier 1 which, for example, represent a product type, a product price, a date of manufacture, and similar characteristics. The data DAT detected by the transmission signal detection means 56 are fed to the sequence control means 41 and, controlled by the sequence control means 41, are relayed for further processing, for example in that they are fed to a so-called host computer.

The repetition frequency detection means 55 are designed to generate information data INFO, the information data INFO in each case representing that repetition frequency which is characteristic of the particular transmission signal received, which in this case therefore is characteristic of how frequently repeated the transmission signal was transmitted from a data carrier 1 to the communication station 40. It should be noted here that the repetition frequency, that is how frequently repeated a transmission signal was transmitted from the data carrier 1 of FIG. 1 to the communication station 40, depends on the field strength acting on the data carrier 1 of FIG. 1, said field strength varying as a function of the distance of the data carrier 1 from the communication station 40.

The information data INFO generated by the repetition frequency detection means 55 can be fed to the sequence control means 41. The sequence control means 41 comprise decision means 57 which are advantageously provided between the repetition frequency detection means 55 and the command signal generating means 43. The decision means 57 are designed so that they generate decision data DDA as a function of information data INFO received from the repetition frequency detection means 55, which decision data DDA can be fed to the command signal generating means 43. The decision data DDA can be used for signaling to the command signal generating means 43 which command signals from the total set of command signals that can be generated may be generated by the command signal generating means 43. This affords the advantage that the command signal generating means 43 receive permission for the generation of specific command signals from the decision means 57. Since the information data INFO delivered to the decision means 57 are dependent upon the repetition frequency detected at any one time, and consequently on the value of the field strength that has been acting on the data carrier which has transmitted a specific transmission signal to the communication station 40, this means that the command signal generating means 43 generate only those command signals that can be meaningfully transmitted to said data carrier. For example, this will mean that no write command signal is transmitted to a data carrier 1 which is relatively far away from the communication station 40 and on which therefore only a weak field strength is acting, because performing such a writing process activated by such a write command signal requires a relatively high power, which, however, in all probability will not be available to a data carrier 1 situated relatively far away from the communication station 40, so that a flawless writing process is not assured.

In the case of the data carriers 1 and circuits 2 of FIG. 1 described above, the inquiry signals IS, suitably amplitude-modulated and coded, are transmitted from a communication station 40 to the relevant data carrier 1, resulting in the immediate generation of a response signal RS in the data carrier 1. Both the interrogation signal IS and the response signal RS take the form of data words of a predetermined word length. It is alternatively possible, however, in the case of another configuration comprising a communication station 40 and a plurality of data carriers 1, for the inquiry signal to take the form of an unmodulated initiating signal generated by the communication station 40, the initiating signal essentially being a sinusoidal signal with no information content and the initiating signal being emitted by the communication station 40 using its transmission means 3 in a communication range of the communication station 40 and being received by the transmission means 3 of a data carrier entering the communication range of the communication station 40, so that the data carrier 1 in question is supplied with power and the generation of a response signal RS is automatically triggered by the generating means 17 of the data carrier 1. In this configuration, the command signal generating means 43, the coding means 44, and the modulation means 45 can be omitted from the communication station 40, and the carrier signal generator 46 can in this case be connected directly to the amplifier means 47, so that the unmodulated carrier signal CS is then transmitted as an interrogation signal or initiating signal to a data carrier 1 entering the communication range of the communication station 40. Furthermore, it is also possible with this configuration to omit the demodulation stage 10 and the decoding stage 11 from each data carrier 1, the "power-on-reset" output of the power supply circuit 7, not represented in FIG. 1, then being connected to the microcomputer 15 or to the data processing means 17, so that the "power-on-reset" signal is fed to the data processing means 17, with the result that generation of the response signal RS, successively repeated with a specific repetition frequency, is initiated by the "power-on-reset" signal.

The invention claimed is:

1. A data carrier for contactless communication with a communication station, the data carrier comprising the means listed below:
    reception means for receiving an interrogation signal, which interrogation signal can be generated by a communication station and can be transmitted to the data carrier in a contactless manner by a field produced by the communication station and acting on the data carrier, and
    generating means for generating a response signal upon reception of the interrogation signal, and
    processing means for processing the response signal, said processing means being designed to process the response signal into a transmission signal suitable for transmission to the communication station, which transmission signal is recurrently transmitted to the communication station with a specific repetition frequency, and
    determination means for calculating at least one representative value, the representative value representing the field strength of the field acting on the data carrier, and
    control connection means between the determination means and the generating means and/or the processing means, said control connection means being designed to controllably influence the generating means and/or the processing means as a function of the at least one representative value, to vary, as a function of the at least one representative value, the repetition frequency with which the transmission signal is transmitted to the communication station.

2. A data carrier as claimed in claim 1, wherein control means, which Interact with the determination means, which are designed to generate control data as a function of the at least one representative value, and which interact with the generating means and/or the processing means in order to vary the repetition frequency with which the transmission signal is transmitted to the communication station, are provided in the control connection means.

3. A circuit for a data carrier for contactless communication with a communication station, the circuit having the means listed below:
    connection means for receiving an interrogation signal, which interrogation signal can be generated by a communication station and can be transmitted to the data carrier and hence to the circuit for the data carrier in a contactless manner by a field produced by the communication station and acting on a data carrier, and
    generating means for generating a response signal upon reception of the interrogation signal, and
    processing means for processing the response signal, said processing means being designed to process the response signal into a transmission signal suitable for transmission to the communication station, which transmission signal is recurrently transmitted to the communication station with a specific repetition frequency, and
    determination means for determining at least one representative value, said representative value representing the field strength of the field acting on the data carrier, and
    control connection means between the determination means and the generating means and/or the processing means, said control connection means being designed to controllably influence the generating means and/or the processing means as a function of the at least one representative value, to vary, as a function of the at least one representative value, the repetition frequency with which the transmission signal is transmitted to the communication station.

4. A circuit as claimed in claim 3, wherein control means, which interact with the determination means and which are designed to generate control data as a function of the at least one representative value and which interact with the generating means and/or the processing means in order to vary, by means of the control data generated, the repetition frequency with which the transmission signal is transmitted to the communication station, are provided in the control connection means.

5. A communication station for contactless communication with a data carrier, the data carrier being designed for contactless communication with the communication station and comprising the following means: reception means for receiving an interrogation signal, which interrogation signal can be generated by the communication station and can be transmitted to the data carrier in a contactless manner by a field produced by the communication station and acting on the data carrier, and generating means for generating a response signal upon reception of the interrogation signal and processing means for processing the response signal, said processing means being designed to process the response signal into a transmission signal suitable for transmission to the communication station, which transmission signal is recurrently transmitted to the communication station with a specific repetition frequency, and determination means for determining at least one representative value, said representative value representing the field strength of the field acting on the data carrier, and control connection means between the determination means and the generating means and/or the processing means, said control connection means being designed to controllably influence the generating means and/or the processing means as a function of the at least one representative value, to vary, as a function of the at least one representative value, the repetition frequency with which the transmission signal Is transmitted to the communication station, the communication station comprising the means listed below;

command signal generating means for generating command signals, and reception means for receiving the transmission signal transmitted from the data carrier to the communication station, and processing means for processing the transmission signal received, and repetition frequency detection means for detecting the repetition frequency with which the transmission signal is transmitted to the communication station, and decision means which interact with the repetition frequency detection means and which are intended and designed to decide on the generation of at least one command signal as a function of the repetition frequency detected by the repetition frequency detection means, with which the transmission signal is transmitted to the communication station.

6. A communication station as claimed in claim 5, wherein the decision means are provided between the repetition frequency detection means and the command signal generating means and are designed to influence the command signal generating means as a function of the repetition frequency, detected by the repetition frequency detection means, with which the transmission signal is transmitted to the communication station, having regard to which command signals are allowed to be generated by the command signal generating means.

7. A communications device comprising:

a receiver that is configured to receive a received signal from a communication system, a controller, operably coupled to the receiver, that is configured to provide a transmission signal after a determined time period corresponding to a repetition frequency, a field-strength determinator, operably coupled to the receiver, that is configured to provide a measure of a field-strength of the received signal, wherein the controller is further configured to determine the time period based on the measure of the field-strength of the received signal.

8. The communications device of claim 7, wherein the controller controls the time period such that an increase in the measure of the field-strength causes an increase in the time period.

9. The communications device of claim 7, further including:

a first detector that is configured to detect a voltage corresponding to the received signal, and a second detector that is configured to detect a current corresponding to the received signal, wherein the measure of the field-strength is based on the voltage and the current.

10. A method of communication, comprising:

receiving a received signal, determining a voltage and a current associated with the received signal, and determining a power measure based on the voltage and current associated with the received signal, and repeatedly providing a response signal at a repetition frequency that repetition frequency varies inversely with the power measure.

* * * * *